United States Patent

Conwell et al.

[11] 4,002,998
[45] Jan. 11, 1977

[54] EXTERNALLY CONTROLLABLE MINIATURE LASERS

[75] Inventors: Esther M. Conwell, Rochester; Dorian Kermisch, Penfield, both of N.Y.

[73] Assignee: Xerox Corporation, Stamford, Conn.

[22] Filed: Oct. 10, 1975

[21] Appl. No.: 621,313

[52] U.S. Cl. .................... 331/94.5 C; 350/96 WG
[51] Int. Cl.² .......................... H01S 3/082
[58] Field of Search .............. 331/94.5; 350/96 WG

[56] References Cited
UNITED STATES PATENTS 3,868,589   2/1975   Wang .................... 331/94.5 C

OTHER PUBLICATIONS

Kogelnik et al., Coupled-Wave Theory of Distributed Feedback Lasers, J. Appl. Phys., vol. 43, No. 5 (May 1972) pp. 2327-2335.

Primary Examiner—William L. Sikes
Attorney, Agent, or Firm—James J. Ralabate; Michael H. Shanahan; Max J. Kenemore

[57] ABSTRACT

Lasers and methods of lasing include introducing light to an optical wave guide from a pumping light source. The wave guide is formed of a deformable elastomer film having a laser active material therein. The film is deformable by an electric field impressed across the thickness of the elastomer film. The electric field causes spatially periodic deformation of the elastomer cross-section, to produce distributed feedback and cause lasing. In one embodiment of the invention, electrodes are spaced from each other by a distance which is a function of the desired laser frequency and in another embodiment the elastic modulus of the film itself is varied as a function of the desired laser frequency.

22 Claims, 6 Drawing Figures

EXTERNALLY CONTROLLABLE MINIATURE LASERS

BACKGROUND AND SUMMARY OF THE INVENTION

This invention relates to integrated optics and, more particularly, to externally controllable miniature lasers and methods of lasing.

Lasers are frequently formed of inactive materials which propagate light and which are doped or otherwise include laser active materials such as dyes or other elements or compounds which are activated or excited when pumped by light of a certain wavelength to produce light at a lasing wavelength. In order to effect lasing in such laser materials, feedback must be created or be present in the material. When feedback exists, the light being emitted by the excited laser molecules will be reflected back upon itself to cause coherent emission from all of the excited molecules and, thereby, cause lasing.

Such laser feedback has been obtained in several ways in the past. In lasers of some size, mirrors have been utilized to create the necessary feedback cavity. Such mirrors may be made, for example, by silvering the ends of an optical wave guide through which the light is propagated. Mirroring has several disadvantages. In the first instance, the ends of the wave guide are frequently incapable of being smoothed to a degree necessary to prevent substantial loss of light due to scattering. In the second instance, mirrored cavities are permanent in nature and other means must be relied upon to effect switching of the laser. Even more significantly, mirrors are generally unusable in integrated optics lasers which employ extremely thin light propagating films of only a few microns in thickness, since mirroring is not easily adapted to the microscopic proportions in the thin films used in integrated optics.

In integrated optics lasers, distributed feedback has generally been achieved in the past either by permanently corrugating the film or by a permanent periodic change in the index of refraction of the thin film. Distributed feedback has been employed in lasers utilizing solid crystal materials or organic films.

Unlike prior lasers, the laser of the present invention has a switchable spatially periodic deformation controlled directly by a force which is impressed on or across the material. The light propagating material of the present invention is preferably formed of a thin elastomer film and this film is preferably deformed by an electric field so as to effect a spatially periodic change in thickness or, more generally, cross-section of the thin film. Such changes in cross-section at properly spaced intervals result in lasing of the light by creating distributed feedback in the film.

In one principal aspect of the present invention, a laser comprises an optical wave guide formed of a deformable material of a given cross-section. The deformable material is capable of guiding light at a predetermined wave length and a laser active material is in the deformable material. Deforming means exerts a force on the deformable material to physically deform the material to cause a change in the given cross-section while the light is being guided through the wave guide to produce laser feedback.

In another principal aspect of the present invention, the deforming means comprises electrode means, and either the electrode means or areas of differing elastic modulus in the deformable material are spaced so as to result in spatial periodic deformation of the deformable material.

In another principal aspect of the present invention, a method of lasing comprises the steps of guiding light through a deformable material of given cross-section having a laser active material therein, and changing the given cross-section to produce laser feedback by physically deforming the deformable material by exerting a force on the material while guiding the light therethrough.

In still another principal aspect of the present invention, the method of lasing includes deforming the material by impressing an electric field across the wave guide so as to spatially periodically deform the material.

These and other objects, features and advantages of the present invention will be more clearly understood through a consideration of the following detailed description.

BRIEF DESCRIPTION OF THE DRAWINGS

In the course of this description, reference will frequently be made to the attached drawings in which.

DESCRIPTION OF THE PREFERRED EMBODIMENTS

Figure 1:
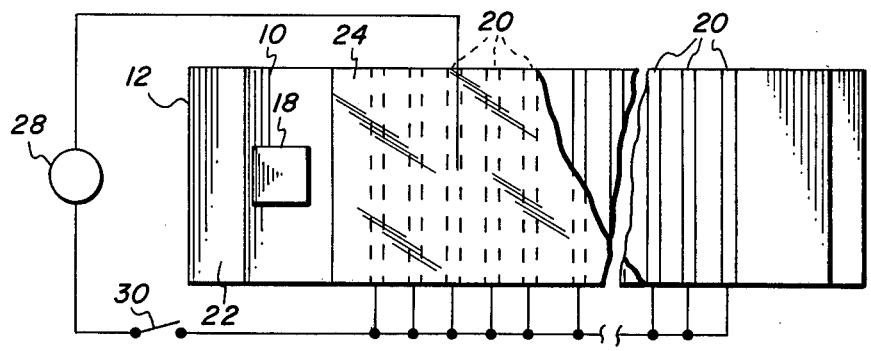
FIG. 1 is a partially cutaway plan view of a laser incorporating the principles of the present invention and which may be employed in practicing the method of the present invention.
Figure 2:
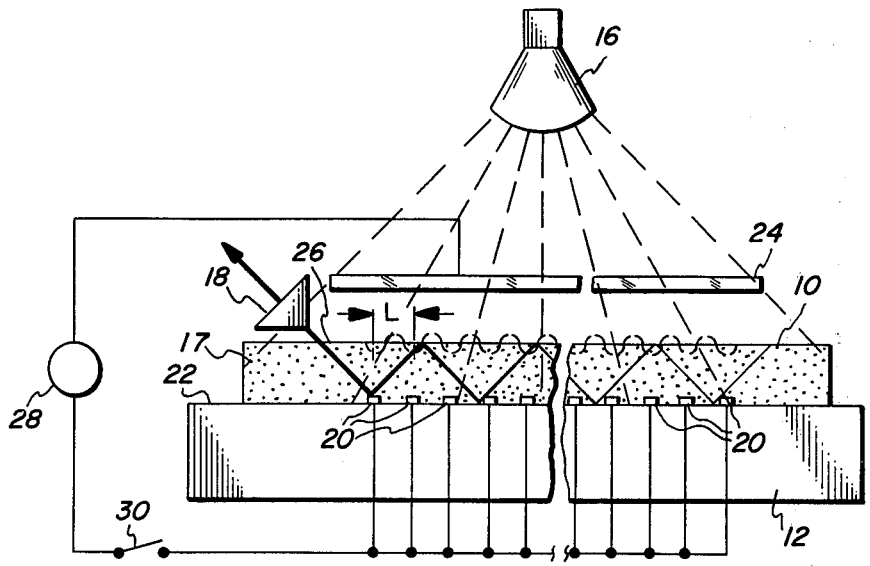
FIG. 2 is an elevation view of the laser shown in FIG. 1.

Referring to FIGS. 1 and 2, a laser incorporating the principles of the present invention preferably includes light guiding means in the form of a thin film 10 of a physically deformable material which is transparent to the light at the lasing frequency and which is coated upon a suitable rigid support substrate 12. The thin film 10 is preferably formed of an elastomer which has greater index of refraction than the support substrate and the air or other medium surrounding the film. The elastomer should be one that is capable of being easily deformed when exposed to a force, such as that exerted by an electric field. A wide variety of elastomers may be selected which meet these requirements. Two such elastomers include cross-linked phenylmethyl polysiloxane ($n$ = about 1.54 – 1.55 at 5700A) or cross-linked dimethyl polysiloxane ($n$ = about 1.40 – 1.41 at 5700A).

Likewise, a wide variety of substrate 12 materials may be employed. The criteria for selection of such substrate materials are that they possess the requisite mechanical properties, e.g. strength and bonding compatibility with the film 10, and that their index of refraction be substantially lower than that of the film 10.

By way of example, a Pyrex microscope glass ($n =$ about 1.51 at 5700A) is a suitable substrate where the phenylmethyl polysiloxane film 10 is employed and lithium fluoride ($n =$ about 1.39 at 5700A) or sodium fluoride ($n =$ about 1.36 at 5700A) may be utilized with films of dimethyl polysiloxane. The letter $n$ is the index of refraction of the material.

The relative thickness of the film 10 and substrate 12 as shown in FIG. 2 are not depicted in actual scale. The film 10 is preferably substantially thinner than the substrate 12, but is shown as being relatively thick for illustration purposes only.

With reference to FIGS. 1 and 2, the pumping light may come from above, below or alongside the thin film, or from one end. The pumping light source 16 may comprise a suitable flash lamp or an array of light emitting diodes emitting at a wavelength of about 8000A, for the film 10 doped with neodymium, which emits light, when excited, at about 10600A. It will be understood that other suitable light sources 16 may be employed in the laser of the present invention along with doping materials appropriate with such light sources for lasing as known in the art. In any event, the film 10 is such that it is capable of guiding light at the frequency or wavelength of the light emitted by the laser material and the light source 16 must also include optical elements that concentrate the light onto the active region of the laser.

The laser light may be coupled out of the film 10 by any of the means known to practitioners of the art, such as a coupling prism 18 or a set of corrugations (not shown) which act as a grating coupler.

In the present invention, the doped film 10 is preferably of a substantially constant thickness of 1 to 10 microns over its length and width. This thickness is periodically spatially varied with a period L along the film, as shown by the dash line in FIG. 2, to create distributed feedback to cause lasing of the laser active material. The quantity L may be expressed precisely by the formula $$L = 2\pi a/2k,$$

where $k$ is the propagation vector of the laser light in the laser material and $a$ is an integer number, i.e. 1, 2, 3, etc. The quantity $2\pi/k$ is approximately equal to the wavelength in the material of the laser light.

The thickness of the film 10 may be spatially varied at intervals L by impressing a force on one or both surfaces of the elastomeric film 10. In the embodiment shown in FIGS. 1 and 2, the force may be exerted by impressing a periodic electric field across the film. One manner of producing such field is to place a plurality of electrodes 20 upon the surface 22 of substrate 12 spaced apart by the distance L defined above. The electrodes 20 are positoned at the interface between the film 10 and the substrate 12. These electrodes may comprise a thin layer of gold or silver of approximately 300 thickness which is sputtered or vacuum evaporated upon the substrate surface 22. A thin insulating layer (not shown), such as quartz, may be positioned between the gold electrodes 20 and the film 10 to decrease losses. In addition to the electrodes 20, another electrode 24, in sheet, mesh or other form, extends transversely across the electrodes 20. Electrode 24 overlies the surface 26 of the film. Electrodes 20 and 24 are connected to each other by a suitable source of high voltage electricity 28 of, for example, about 50–250 volts and a switch 30 is provided in the circuit to energize the electrodes.

Figure 3:
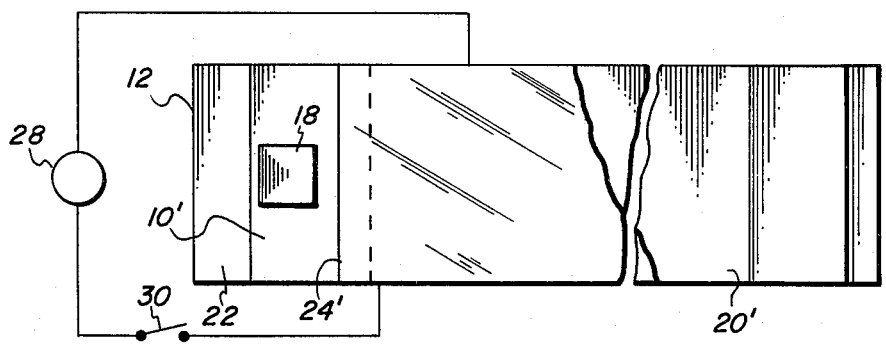
FIG. 3 is a partially cutaway plan view of another embodiment of laser incorporating the principles of the present invention and which may be employed in practicing the method of the present invention.
Figure 4:
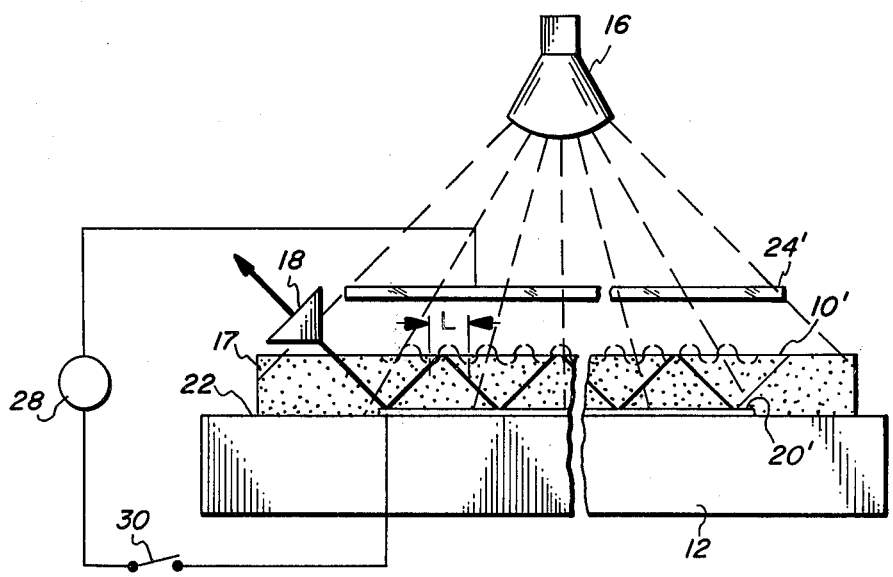
FIG. 4 is an elevation view of the laser shown in FIG. 3.

Referring to FIGS. 3 and 4, a second embodiment of laser and method is illustrated in which the plural spaced electrodes 20 are replaced with a single electrode 20' and the deformable film 10' has been pretreated or prefabricated so as to define spaced portions along its length of differing elastic modulus.

In this embodiment the film 10' is especially prefabricated so that transversely extending alternating bands of one elastic modulus are spaced from each other by alternating bands of a differing elastic modulus, such that midpoints of the bands of the same elastic modulus are separated from each other by a distance substantially equal to the period L. This can be accomplished several different ways. One way, for example, would be by irradiating the film with spatially varying ultraviolet light frm an argon or helium-cadmium laser during the curing of the elastomer. Such spatially varying light (interference fringes) may be produced in well known ways.

In this embodiment the electric field between electrodes 20' and 24' is substantially constant along the length of the film 10' in the direction of travel of the light. Thus, a constant force is impressed on the surface of the film 10' over its length. However, because the elastic modulus of the film varies periodically along the film, spatially periodic deformation of the film will occur under this constant force.

As in the laser shown in FIGS. 1 and 2, continuous electrode 20' can be separated from the elastomer by a thin insulating layer of quartz or the like (not shown). The electrode 20', like electrodes 20, may also be formed on the surface 22 of substrate by depositing a thin layer of gold or silver of about 300A thickness by sputtering or vacuum evaporation.

The embodiment shown in FIGS. 3 and 4 has the advantage of minimizing difficulties in manufacture encountered in positioning of the electrodes 20 shown in FIGS. 1 and 2. Electrodes 20 must be placed quite close together necessitating accurate manufacturing techniques and possible electrical breakdown problems during use of the laser. These problems are avoided in the laser embodiment illustrated in FIGS. 3 and 4.

Figure 5:
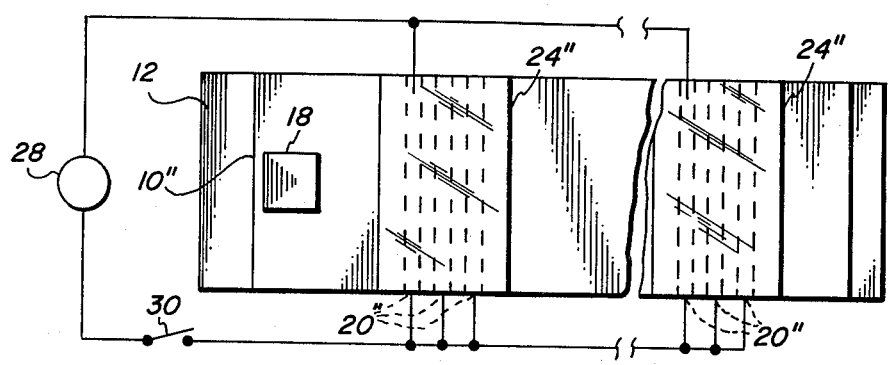
FIG. 5 is a partially cutaway plan view of still another embodiment of laser incorporating the principles of the present invention and which may be employed in practicing the method of the present invention.
Figure 6:
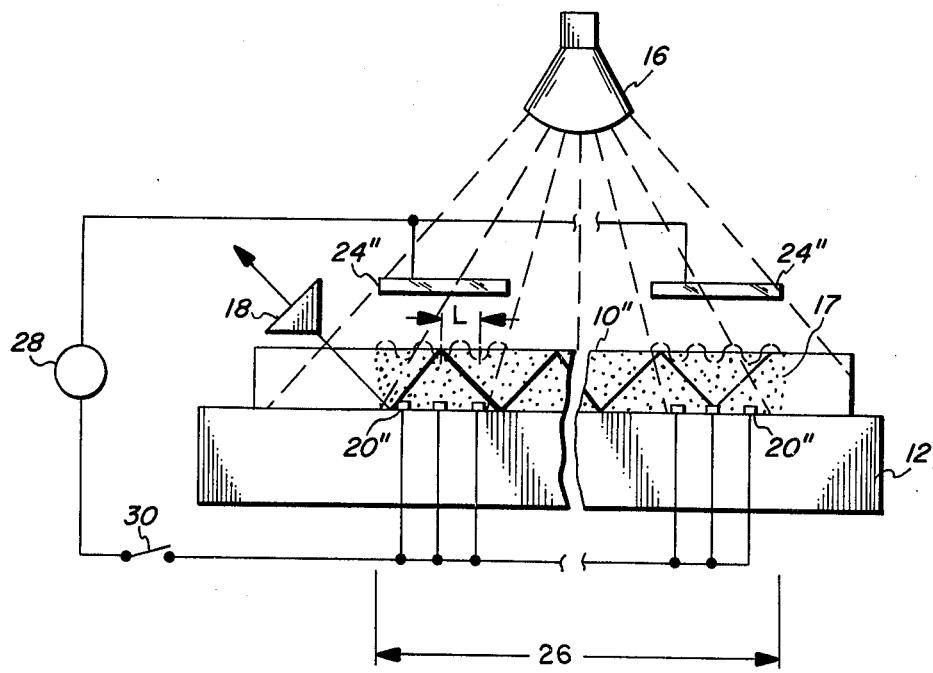
FIG. 6 is an elevation view of the laser shown in FIG. 5.

Referring to FIGS. 5 and 6, a third embodiment of laser and method is illustrated. This embodiment is essentially the same as the embodiment shown in FIGS. 1 and 2, except that the film 10'' is doped with the laser active material 17 over only a portion 26 of its length and electrodes 20'' and 24'' are located only at the upstream and downstream boundaries of portion 26. As in the embodiment shown in FIGS. 1 and 2, the electrodes 20'' (which are many more in number than shown) in each set of electrodes are spaced from each other by the distance L and are constructed the same as electrodes 20. The gap between the two sets of electrodes is an integer times L. When the electrodes 20'' and 24'' are energized to impress an electric field across the film 10''', the film is spatially periodically deformed to produce distributed feedback. In still another embodiment (not shown) the laser active material is incorporated only in the region between the two sets of electrodes 20''. In this case when the electrodes are energized the resulting spatially periodic deformation acts like a distributed mirror at each end.

Although it is believed that the foregoing description of the invention is clearly adequate to enable one skilled in the art to make and use a laser and practice a method in accordance with the principles of the present invention, the preparation of two suitable phenylmethyl polysiloxane elastomer films doped with meodymium are set forth, by way of example. Dimethyl polysiloxanes are commercially available. It will be understood that the phenylmethyl and dimethyl polysiloxane elastomers are by no means exhaustive of all elastomers that may be employed in practicing the present invention and are set forth by way of example only. Numerous other elastomers of suitable transparency and mechanical properties may be employed as the light propagating film in the present invention. Likewise, other active materials such as dyes, may be incorporated into the elastomer.

EXAMPLE 1

Phenylmethyl polysiloxane cyclics were prepared following the procedure outlined in U.S. Pat. No. 3,546,265:

100 c.c. of isopropyl ether and 75 g. of conc. HCl were charged into a flask. This charge was heated to 50°–55° C and a feed of 191.0g. of $\phi$ MeSiCl$_2$ in 100 c.c. of isopropyl ether was added dropwise to the charge while stirring over 1½ hours.

After addition of the feed was completed, the mixture was stirred for an additional 30 minutes at 50°–55° C and then cooled to 25° C.

This cooled mixture was given a first wash with 150 c.c. of NaCl—H$_2$O and the HCl—H$_2$O bottom layer was siphoned off.

A second and third wash of 150 c.c. of a 2% NaHCO$_3$—H$_2$O were given to a slightly alkaline pH.

Several subsequent washes with 150 c.c. of NaCl—H$_2$O were given to a neutral pH.

The mixture was then filtered and vacuum stripped to remove the isopropylether resulting in a yield of 117.0g. of crude product.

This product was vacuum distilled to produce a mixture of ($\phi$MeSiO)$_3$, b.p. about 180° C/2mm and ($\phi$MeSiO)$_4$, b.p. about 237° C/2mm and a total weight of 85.0g.

Phenylmethyl polysiloxane gumstock containing reactive pendant amine cross-linking sites was prepared as follows:

The following was charged into a beaker:
8.0g. of the ($\phi$MeSiO)$_x$ cyclics
2.0g. of (Me$_2$SiO)$_4$ cyclic tetramer
0.2g. of ($\Delta$-NH$_2$ Bu MeSiO)$_x$ cyclics
100 ppm of tetramethyl ammonium silanolate catalyst.

The beaker was sparged with nitrogen and placed in a 95° C vacuum oven at full vacuum. After 3 hours, the temperature was raised to 150° C for 2 hours to decompose the catalyst and remove fragment molecules. The resulting product was a clear, somewhat sticky gum. This gum was then completely dissolved in tetrahydrofuran at the ratio of 20 wt. % solids to tetrahydrofuran.

5.0g of the above product solution was mixed with 0.02g of neodymium acetylacetonate [Nd(C$_5$H$_7$O$_2$)$_3$] dissolved in tetrahydrofuran and 0.2g of a cross-linked solution of the acetone oxime adduct of toluene-2, 4-diisocyanate (5 wt. % in tetrahydrofuran) and coated on a suitable substrate and the solvent was evaporated.

This desolvated mixture was heated at 60° C for about 30 minutes to form a cross-linked or cured elastomeric film on the substrate.

EXAMPLE 2

A phenylmethyl polysiloxane gumstock containing both pendant amine and anil (Schiff base) pendant sites was prepared as follows:

5.0g of the 20 wt % product solution described in Example 1 was mixed with 0.005g of salicylaldehyde [2—HOC$_6$H$_4$CHO] in the presence of 4A molecular sieve and allowed to react at room temperature overnight.

The molecular sieve was removed by filtration and to the filtrate was added 0.02g of neodymium acetyl acetonate [Nd)C$_5$H$_7$O$_2$)$_3$] dissolved in tetrahydrofuran and 0.2g of a crosslinked solution of the acetone oxime adduct of toluene-2, 4diisocyanate (5 wt. % in tetrahydrofuran and coated on a suitable substrate and the solvent was evaporated.

This desolvated mixture was heated at 60° C for about 30 minutes to form a cross-linked or cured elastomeric film on the substrate.

EXAMPLE 3

A film was prepared, as described in Example 1, except the silicone polymer was a polydimethylxiloxane containing pendant amine cross-linking sites.

EXAMPLE 4

A film was prepared, as described in Example 2, except the silicone polymer was a polydimethylsiloxane containing both pendant amine and anil (Schiff base) pendant sites.

It will be understood that the specific lasers and methods described herein are merely a few preferred embodiments which incorporate the principles of the present invention and that other elastomers and means of generating forces capable of deforming the light guiding means or film 10 may be employed without departing from the principles of the invention. For example, electrodes 20, might be replaced with photoconductive strips and electrode 24 may be replaced by suitable illuminating means which may be periodically switched on or off to energize the photoconductive strips. In addition, suitable mechanical or magnetic means may be employed to deform film 10.

It will also be understood that the embodiments of the present invention which have been described are merely illustrative of a few of the applications of the principles of the invention. Numerous other modifications may be made by those skilled in the art without departing from the true spirit and scope of the invention.

What is claimed is:

1. A laser comprising:
    an optical wave guide, said wave guide being formed of a deformable material of a given cross-section, said deformable material being a material being capable of guiding light at a predetermined wave length therethrough,
    laser active material in said deformable material, a pumping light source to which the laser active material is responsive, and
    deforming means for exerting a force on said deformable material while the light is being guided therethrough to physically deform said deformable material to cause a change in said given cross-section such as to produce laser feedback.
2. The laser of claim 1 wherein said deforming means comprises electrode means positioned relative to said wave guide to produce an electric field across said deformable material, and control means for selectively energizing said electrode means.

3. The laser of claim 2 wherein said electrode means comprise a plurality of electrodes spaced from each other in a direction substantially parallel to the direction in which the light is guided through said deformable material to spatially periodically deform the deformable material.

4. The laser of claim 3 wherein said electrode means are spaced from each other by a distance equal to $2\pi a/2k$, where $a$ is an integer number and $k$ is the propagation vector of the laser light.

5. The laser of claim 2 wherein said deformable material comprises a plurality of areas of substantially same elastic modulus between areas of a different elastic modulus, the areas of same elastic modulus being spaced from each other in a direction substantially parallel to the direction in which the light is guided through said deformable material to spatially periodically deform the deformable material.

6. The laser of claim 5 wherein said areas of same elastic modulus are spaced from each other by a distance equal to approximately $2\pi a/2k$, where $a$ is an integer number and $k$ is the propagation vector of the laser light.

7. The laser of claim 1 wherein said deformable material is an elastomer.

8. The laser of claim 1 wherein said wave guide comprises a film of said deformable material a portion of which is doped with said laser active material, and said deforming means is positioned to deform said deformable material adjacent the boundries of said doped portion to produce laser feedback.

9. The laser of claim 1 wherein said wave guide comprises a thin film of said deformable material doped with said laser active material, and said film is supported upon a rigid substrate having an index of refraction less than the index of refraction of said film.

10. The laser of claim 9 wherein said deforming means comprises electrode means between said thin film and said substrate and a second electrode adjacent the surface of said thin film opposite said substrate.

11. The laser of claim 1 wherein said wave guide comprises a thin film of an elastomer having said laser active material therein, said elastomer film being supported upon a rigid substrate having an index of refraction less than the index of refraction of said thin film, said deforming means comprises first electrode means between said elastomer film and said substrate and second electrode means adjacent the surface of said elastomer film opposite said substrate, and control means for energizing said electrode means.

12. The laser of claim 11 wherein at least one of said electrode means comprises a plurality of electrodes spaced from each other in a direction substantially parallel to the direction in which the light is guided through said deformable material to spatially periodically deform the deformable material.

13. The laser of claim 12 wherein said one of said electrode means is spaced from each other by a distance equal to approximately $2\pi a/2k$, where $a$ is an integer number and $k$ is the propagation vector of the laser light.

14. The laser of claim 11 wherein said deformable material comprises a plurality of areas of substantially same elastic modulus between areas of a different elastic modulus, the areas of same elastic modulus being spaced from each other in a direction substantially parallel to the direction in which the light is guided through said deformable material to spatially periodically deform the deformable material.

15. The laser of claim 14 wherein said areas of same elastic modulus are spaced from each other by a distance equal to approximately $2\pi a/2k$, where $a$ is an integer number and $k$ is the propagation vector of the laser light.

16. A method of lasing comprising the steps of:
guiding light from a pumping light source through a deformable material of given cross-section which includes a laser active material responsive to light from the pumping light source in the deformable material, and changing said given cross-section to produce laser feedback by physically deforming said deformable material by exerting a force on said deformable material while guiding the light therethrough.

17. The method of claim 16 wherein said deformable material is periodically deformed by impressing an electric field across its thickness.

18. The method of claim 17 wherein said electric field is spatially periodic.

19. The method of claim 18 wherein the length of the period of said field is equal to approximately $2\pi a/2k$, where $a$ is an integer number and $k$ is the propagation vector of the laser light.

20. The method of claim 17 wherein said electric field is substantially uniform and the elastic modulus of said deformable material varies in said field in a spatially periodic manner.

21. The method of claim 20 wherein the length of the period of the variation in the elastic modulus is equal to approximately $2\pi a/2k$, where $a$ is an integer number and $k$ is the propagation vector of the laser light.

22. The method of claim 16 wherein said deformable material is deformed at two spaced apart locations on said material and said laser active material is located between said spaced apart locations.

* * * * *